United States Patent [19]
Hong et al.

[11] Patent Number: 5,650,069
[45] Date of Patent: Jul. 22, 1997

[54] DUAL-STAGE BIOLOGICAL PROCESS FOR REMOVING NITROGEN FROM WASTEWATER

[75] Inventors: Sun-Nan Hong; Finn M. Nielsen, both of Cary; O. Roy Langslet, Chapel Hill, all of N.C.

[73] Assignee: Krüger, Inc., Cary, N.C.

[21] Appl. No.: 525,088

[22] Filed: Sep. 8, 1995

[51] Int. Cl.[6] .................. C02F 3/12; C02F 3/30
[52] U.S. Cl. .......... 210/605; 210/622; 210/624; 210/626; 210/629; 210/630; 210/903; 210/906
[58] Field of Search .................. 210/605, 620, 210/622, 623, 624, 626, 629, 630, 903, 906

[56] References Cited

U.S. PATENT DOCUMENTS

| | | | |
|---|---|---|---|
| 3,964,998 | 6/1976 | Barnard | 210/605 |
| 4,183,810 | 1/1980 | Baenens et al. | 210/605 |
| 4,917,802 | 4/1990 | Fukaya et al. | 210/630 |
| 5,213,681 | 5/1993 | Kos | 210/605 |
| 5,252,214 | 10/1993 | Lorenz et al. | 210/622 |
| 5,288,406 | 2/1994 | Stein | 210/624 |
| 5,447,633 | 9/1995 | Matsche et al. | 210/624 |
| 5,480,548 | 1/1996 | Daigger et al. | 210/605 |
| 5,514,278 | 5/1996 | Khudenko | 210/605 |

*Primary Examiner*—Neil McCarthy
*Assistant Examiner*—Theodore M. Green
*Attorney, Agent, or Firm*—Rhodes, Coats & Bennett, L.L.P.

[57] ABSTRACT

A process for biologically removing nitrogen and other nutrients from wastewater using recycled activated sludge. A mixed liquor is formed from influent wastewater and recycled activated sludge and then treated in two successive nitrogen removal stages, each stage having an anoxic denitrification zone and an aerobic nitrification zone. The first nitrogen removal stage entails circulating the mixed liquor back and forth between the anoxic zone and the aerobic zone. The mixed liquor is then transferred to a final clarifier where activated sludge is separated from purified supernatant. To increase the $NO_x^-$ reducing enzymatic activity of denitrification microorganisms, the activated sludge is retained in the final clarifier for a time period sufficient to permit adaptation of these microorganisms to a nitrate/nitrite-respiring metabolic pathway. To maintain high levels of denitrifying microorganisms and thereby effectuate greater nitrogen removal than previously possible, a portion of the activated sludge is recycled from the final clarifier directly into the second nitrogen removal stage.

12 Claims, 2 Drawing Sheets

DUAL-STAGE BIOLOGICAL PROCESS FOR REMOVING NITROGEN FROM WASTEWATER

FIELD OF THE INVENTION

The present invention relates generally to activated sludge systems for the treatment of wastewater and more particularly relates to microbiological processes for removing nitrogen from wastewater.

BACKGROUND OF THE INVENTION

Eutrophication of lakes, rivers, and other water resources is caused by an excessive amount of dissolved nutrients in the water, such as phosphorus and nitrogen compounds. Introduced into environmental waters by untreated or ineffectively treated wastewater, these pollutants promote excessive growth of algae and other aquatic plants, which results in a decline in dissolved oxygen concentrations. In severe instances, the dissolved oxygen concentrations are reduced below the level needed to sustain fish and other animal life. Despite increased awareness of these problems and governmental action aimed at solving them, currently used methods of wastewater treatment often fall short of removing sufficient amounts of these nutrients to prevent damage to water resources. Therefore, there remains a need for an improved water treatment process to better alleviate problems caused by discharging polluting nutrients into environmental waters.

Numerous biological nutrient removal processes have been developed that, instead of chemicals, utilize microorganisms found in activated sludge to effect nutrient removal. Several of these microbiological nutrient removal processes are described in U.S. Pat. No. 3,964,998, issued Jun. 22, 1976, to Barnard and U.S. Pat. No. 5,213,681, issued May 25, 1993, to Kos, both of which are hereby expressly incorporated by reference.

The Barnard patent teaches a process for removing nitrogen from wastewater by passing the wastewater through two successive nitrogen removal stages. First, wastewater influent is mixed with return activated sludge (RAS) to form a mixed liquor prior to the first nitrogen removal stage. The RAS provides denitrifying microorganisms and additional organic material to the wastewater influent. The mixed liquor then passes through the two nitrogen removal stages, each of which in turn includes two distinct treatment zones that are categorized as anoxic or aerobic depending on their respective dissolved oxygen concentrations. In the aerobic (nitrification) treatment zone of each stage, ammonia and organic nitrogen present in the mixed liquor are converted by nitrifying microorganisms into nitrate and nitrite. In the anoxic (denitrification) treatment zone of each stage, denitrifying microorganisms reduce nitrate and nitrite in the mixed liquor to elemental nitrogen gas, $N_2O$ gas, and other minor forms of nitrogenous gas, all of which pass from the mixed liquor into the atmosphere. In the Barnard process, mixed liquor is circulated between the anoxic and anaerobic treatment zones in the first nitrogen removal stage. After the mixed liquor passes through the dual treatment stages, it reaches a solids separation stage where it is separated into a clarified effluent and activated sludge. A portion of the activated sludge is then recycled to form the mixed liquor prior to the first stage.

The Kos patent teaches another activated sludge process that achieves nitrogen compound removal by utilizing multiple nitrogen removal stages. In each nitrogen removal stage, mixed liquor is circulated back and forth between an anoxic zone and an aerobic zone. The mixed liquor is transferred from one nitrogen removal stage to the next, either from the anoxic zone of one stage to the anoxic zone of the next stage, or from the aerobic zone of one stage to the aerobic zone of the next stage. From the final nitrogen removal stage, the mixed liquor is transferred to a clarifier where activated sludge is separated from clear effluent. A portion of the activated sludge is then recycled to the influent wastewater at a rate of approximately 100% of the influent flow rate to form the mixed liquor prior to the first nitrogen removal stage. The process may also include an anaerobic treatment zone preceding the first nitrogen removal stage for removing phosphorus from the wastewater.

While the Barnard and Kos patents disclose activated sludge processes for removing nitrogen from wastewater, ever-tightening governmental regulations dictate greater efficiency in reducing the amount of nitrogen compounds discharged from wastewater treatment facilities. In addition, existing methods of nitrogen removal currently in use typically require either deep bed nitrification filters or large anoxic tanks with external carbon sources, both of which are expensive. Accordingly, there remains a need for an improved activated sludge process that optimizes nitrogen removal from wastewater, which is cost-effective, and which minimizes capital outlays needed to retrofit existing activated sludge systems.

SUMMARY AND OBJECTS OF THE INVENTION

The present invention is a process for biologically removing nutrients from wastewater using return activated sludge. First, a mixed liquor is formed from influent wastewater and return activated sludge and then transferred to a first nitrogen removal stage. The mixed liquor is treated in the first nitrogen removal stage by circulating the mixed liquor back and forth between a first anoxic zone and a first aerobic zone. In the anoxic zone, the mixed liquor is maintained under anoxic conditions for a time period sufficient to permit denitrifying microorganisms to reduce nitrates and nitrites in the mixed liquor to elemental nitrogen, thereby effecting denitrification. In the first aerobic zone, the mixed liquor is aerated for a time period sufficient to permit nitrifying microorganisms to convert ammonia and organic nitrogen in the mixed liquor into nitrates and nitrites, thereby effecting nitrification. The mixed liquor is then transferred to a second nitrogen removal stage where the mixed liquor is again subjected to both denitrification and nitrification. Finally, the mixed liquor is transferred to a final clarifier where activated sludge is separated from purified supernatant.

To increase the activity of denitrifying microorganisms in the activated sludge, the sludge is retained in the final clarifier under anaerobic conditions for a period of time sufficient to permit adaptation of the denitrifying microorganisms due to the lack of oxygen and a resulting increase in their uptake of nitrates and nitrites for respiration. To form the mixed liquor, a first portion of the activated sludge is recycled from the final clarifier into the wastewater influent before treatment in the first nitrogen removal stage. A second portion of the activated sludge is recycled from the final clarifier into the mixed liquor between the first and second nitrogen removal stages. The addition of activated sludge midway through the nitrogen removal process helps maintain a high population of denitrifying microorganisms throughout the process. In particular, this secondary addition of activated sludge enhances the denitrification rate in the second anoxic zone, thereby optimizing nitrogen removal from the mixed liquor.

Based on the foregoing, it is an object of the present invention to provide an improved nitrogen removal process using return activated sludge (RAS) and a series of wastewater treatment zones.

Another object of the present invention is to provide an improved activated sludge process for removing nitrogen that achieves high reaction rates and high removal efficiencies.

A further object of the present invention is to provide an improved activated sludge process for removing nitrogen in which the total retention time is comparable to or less than that of a conventional activated sludge system.

Another object of the present invention is to provide an improved activated sludge process for removing nitrogen in which denitrification is optimized by the strategic adaptation of denitrifying bacteria for use in the process.

Another object of the present invention is to provide an improved activated sludge process for removing nitrogen that utilizes two nitrogen removal stages and wherein the return activated sludge is split into two portions with one portion of the sludge being introduced directly into the second, downstream nitrogen removal stage so as to optimize denitrification in the second, downstream nitrogen removal stage.

Still another object of the present invention is to provide an improved activated sludge process for removing nitrogen from wastewater in which the denitrifying activity of microorganisms is rejuvenated by retaining the activated sludge in an anaerobic condition prior to recycling the activate sludge into the mixed liquor.

An additional object of the present invention is to provide an improved activated sludge process for removing nitrogen from wastewater at a relatively low cost as compared to other biological nutrient removal systems.

Still another object of the present invention is to provide an improved activated sludge process for biologically removing nitrogen from wastewater that requires a relatively small anoxic volume and no denitrification filter, thereby reducing the capital costs required for upgrading conventional activated sludge systems.

Other objects and advantages of the present invention will become apparent and obvious from a study of the following description and the accompanying drawings, which are merely illustrative of such invention.

DETAILED DESCRIPTION OF THE INVENTION

Figure 1:
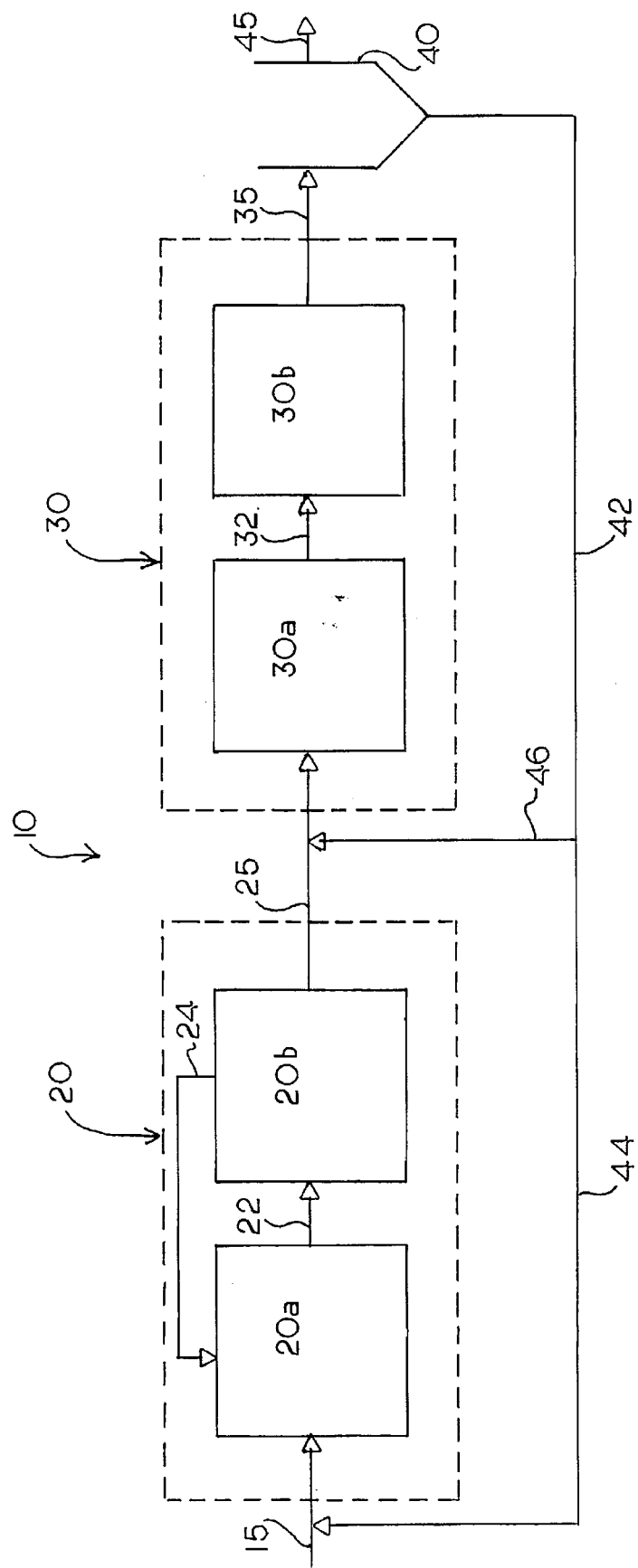
FIG. 1 is a schematic diagram illustrating the basic process steps in accordance with the present invention.

Referring now to the drawings in general, an activated sludge process for biologically removing nitrogen from wastewater influent is schematically shown therein. In the embodiments disclosed, the activated sludge system includes two nitrogen removal stages and a final clarifier; however, the system could include three or more nitrogen removal stages if desired. Each nitrogen removal stage includes an anoxic denitrification zone and an aerobic nitrification zone.

At this point, it is helpful to define "aerobic," "anaerobic," and "anoxic," as these terms are used in the present disclosure. First, it should be understood that "aerobic" means "oxygenated" or "aerated." "Anaerobic" is defined as the state existing within a wastewater treatment zone that is substantially free of both dissolved oxygen and dissolved nitrates/nitrites (collectively referred to hereinafter as $No_x^-$). Under anaerobic conditions, the dissolved oxygen concentration is less than approximately 0.7 ppm (parts-per-million) and preferably less than 0.4 ppm, while the dissolved $No_x^-$ concentration is less than approximately 0.3 ppm and preferably less than 0.2 ppm expressed as elemental nitrogen. In an anaerobic zone, microorganisms primarily utilize energy derived from hydrolysis of polyphosphates for biological oxygen demand (BOD) absorption. Finally, "anoxic" is defined as the state existing within a wastewater treatment zone wherein the dissolved $No_x^-$ concentration is greater than approximately 0.5 ppm expressed as elemental nitrogen. However, like an anaerobic zone, the dissolved oxygen concentration in an anoxic zone is less than approximately 0.7 ppm (parts-per-million) and preferably less than 0.4 ppm. Under anoxic conditions, microorganisms primarily use $No_x^-$ for metabolism.

Turning now to FIG. 1, a first embodiment of the activates sludge system is shown therein and indicated generally by the numeral 10. The first nitrogen removal stage is indicated by the numeral 20 and includes a first anoxic zone 20a and a first aerobic zone 20b. The second nitrogen removal stage is indicated by the numeral 30 and includes a second anoxic zone 30a and a second aerobic zone 30b. The final clarifier is indicated by the numeral 40. Primary effluent from a primary treatment structure (not shown) is mixed with return activated sludge (RAS) recycled from the final clarifier 40 to form a mixed liquor and then enters the first nitrogen removal stage 20 through line 15.

In the first nitrogen removal stage 20, mixed liquor flows from the anoxic zone 20a to the aerobic zone 20b through line 22. The aerobic zone 20b is connected to the anoxic zone 20a in a recirculation loop so that a portion of the mixed liquor in the aerobic zone 20b is returned to the anoxic treatment zone 20a through internal recycle line 24. In the second nitrogen removal stage 30, mixed liquor passes from a second anoxic zone 30a to a second aerobic zone 30b through line 32.

Both of the nitrogen removal stages 20, 30 are linked in sequential fashion so that the mixed liquor passes sequentially from the first stage 20 through the second stage 30 to the final clarifier 40. In the embodiment shown in FIG. 1, the first aerobic zone 20b is linked to the second anoxic zone 30a. Mixed liquor passes from the first aerobic zone 20b to the second anoxic zone 30a through line 25, and from the second aerobic zone 30a to the final clarifier 40 through line 35.

In the final clarifier 40, the suspended solids are allowed to settle to the bottom of the clarifier. The settled solids are returned through lines 42 and 44 to the first nitrogen removal stage 20 and through lines 42 and 46 to the second nitrogen removal stage 30. The clear supernatant (effluent or treated wastewater) is sent to receiving streams or reservoirs through effluent line 45 with or without further treatment.

Focusing now on the actual operation of the nitrogen removal stages 20, 30, the mixed liquor is first directed to the anoxic zone 20a of the first stage 20 where the mixed liquor is maintained for a sufficient time period for nitrate and nitrite present to be reduced by denitrifying microorganisms to elemental nitrogen and other nitrogenous gasses. During reduction, the nitrate and nitrite present in the mixed liquor is used as a terminal electron acceptor. Nitrogen gas is then released to the atmosphere thereby resulting in nitrogen removal from the mixed liquor. In the anoxic zone 20a, the mixed liquor is stirred, but not aerated, to keep the solids in suspension and to maintain thorough contact between the recycled sludge and the influent wastewater.

While nitrogen in the form of nitrates and nitrites is removed from the mixed liquor in the anoxic zone 20a, ammoniac nitrogen and organic nitrogen compounds in the mixed liquor remain unchanged as the mixed liquor passes through the first anoxic zone 20a. To convert ammonia and organic nitrogen to nitrates and nitrites, the mixed liquor is transferred from the first anoxic zone 20a to the first aerobic zone 20b through line 22. In the aerobic treatment zone 20b, the mixed liquor is aerated to maintain a dissolved oxygen concentration of at least 0.5 mg/l, and preferable in the range of 1.0 to 4.0 mg/l. Nitrifying microorganisms convert ammonia and organic nitrogen compounds in the mixed liquor to nitrate and nitrite ($No_x^-$).

Nitrified mixed liquor formed in the aerobic zone 20b is then recirculated back to the first stage anoxic zone 20a through line 24. The rate of recirculation between the anoxic zone 20a and the aerobic zone 20b is preferably maintained between 100%–200% of the influent flow rate, because recirculation rates in excess of 200% dilute the BOD concentration in the anoxic zone 20a, which would reduce reaction rates and impair denitrification. Preferably, the recycle rate is approximately 100% of the influent flow rate.

Next, the mixed liquor is transferred to the second nitrogen removal stage 30 through line 25, which connects the first aerobic zone 20b to the second anoxic zone 30a. The nitrification and denitrification processes in the second nitrogen removal stage 30 are identical to the processes described above in the first stage 20, except that in the embodiments illustrated herein, there is no internal recycle between the second anoxic zone 30a and the second aerobic zone 30b.

After treatment in the nitrogen removal stages 20 and 30, the mixed liquor is transferred to the final clarifier 40 where solids in the form of activated sludge settle to the bottom, leaving a clear supernatant or effluent that is drained off through effluent line 45. The activated sludge settles in the bottom of the clarifier 40 and is then held under anaerobic conditions. In the preferred process of the invention, the activated sludge is not immediately recycled to form the mixed liquor. Instead, the activated sludge is retained in the final clarifier 40 in an anaerobic state for a period of approximately 30 minutes to 4 hours, preferably approximately 2 hours.

To understand the reason for holding the activated sludge in an anaerobic state, a brief review of denitrifying microorganisms is helpful. Denitrifying bacteria used in the nitrogen removal process of the present invention can be described as facultative anaerobes, as opposed to true anaerobes. True anaerobes cannot live in the presence of oxygen. Facultative anaerobes, on the other hand, normally respire oxygen but are capable of employing other cellular respiration pathways in the absence of oxygen. In the anoxic zones 20a, 30a of the present invention, $No_x^-$ replaces oxygen as the final electron receptor in the cells' respiration pathway. However, such an adaptation does not occur instantaneously. Because cellular respiration reactions require enzymatic catalysts, sufficient cellular levels of the enzyme responsible for catalyzing the reduction of $No_x^-$ must be produced by the bacteria before efficient respiration of $No_x^-$ can occur. Therefore, when the activated sludge is held in the final clarifier 40 under anaerobic conditions for a period of time, the concentrations of these $No_x^-$ reducing enzymes in the bacterial cells increase as the bacteria adapt to the lack of oxygen by producing this denitrification enzyme in order to use $No_x^-$ as the final electron receptor. Additionally, during the sludge retention time, hydrolysis of organics generates a carbon source, which also benefits denitrification.

In another aspect of the present invention that is unlike previously developed microbiological systems for removing nitrogen from wastewater, the mixed liquor in the present process is supplemented between the first and second nitrogen removal stages with additional activated sludge recycled from the final clarifier 40. As seen in FIG. 1, this additional activated sludge is delivered from the clarifier 40 through lines 42 and 46 into line 25 between the two stages 20, 30. In a typical application, the activated sludge is recycled from the final clarifier 40 through line 42 at a total rate of approximately 30%–80% of the influent rate of the wastewater into the system. The rate of sludge recycled through line 44 into influent line 15 to form the mixed liquor is typically approximately 20%–60% of the wastewater influent rate; whereas, the rate of sludge recycled through line 46 into line 25 between the nitrogen removal stages 20, 30 is typically approximately 10%–30% of the wastewater influent rate. These flow rates, based on influent flow, may be varied depending on the conditions and characteristics of the influent wastewater.

The purpose of recycling activated sludge into the mixed liquor after the mixed liquor has been treated in the first nitrogen removal stage 20 is to supply both additional denitrifying microorganisms as well as additional organic matter (carbon) to the mixed liquor. By maintaining a large population of denitrifying microorganisms throughout the process, greater amounts of nitrogen are removed from the wastewater than is possible using previously designed systems. In addition, because the activated sludge added immediately prior to the second anoxic zone 30a has been retained for a period of time in the final clarifier 40 before recycling, the denitrifying microorganisms have relatively high levels of the $No_x^-$ reducing enzyme. With conventional activated sludge systems, by the time denitrifying microorganisms have reached the second nitrogen removal stage, they have already been subjected to the aerobic treatment zone in the first nitrogen removal stage. Therefore, with conventional systems, the concentrations of the $No_x^-$ reducing enzymes have been significantly depleted because the cells have readapted to respiring oxygen in the aerobic zone of the first nitrogen removal stage. With the process of the present invention, the denitrifying microorganisms added between the first and second nitrogen removal stages 20, 30 are in a condition where they are adapted to respire $NO_x^-$ immediately and efficiently. Thus, an even greater amount of denitrification in the second anoxic zone 30a is observed than with conventional activated sludge systems.

The process of the invention is efficient and cost-effective because no chemicals or supplemental organic material are required for the process to meet stringent effluent requirements. Carbon and the energy source for denitrification is provided by the BOD contained in the influent wastewater and in the return activated sludge. During the anoxic treatment, BOD is oxidized by the denitrifying bacteria using $No_x^-$. Additionally, relatively small volumes are required in the anoxic zones 20a, 30a, and no denitrification filter is required. Thus, the present invention combines BOD removal, nitrification, and denitrification into an efficient and cost-effective activated sludge process where the sole energy source is provided by the BOD in the influent.

Figure 2:
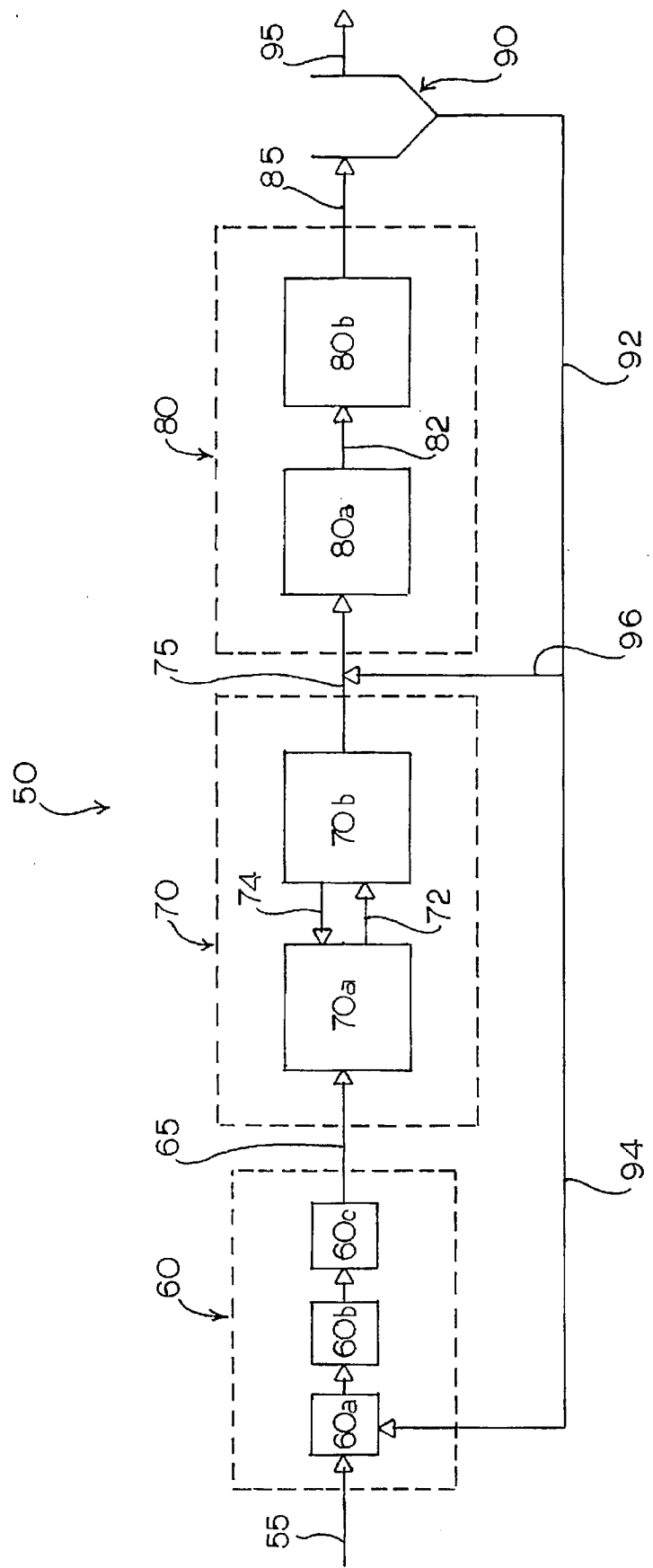
FIG. 2 is a schematic diagram illustrating the basic process steps in accordance with another embodiment of the present invention.

In some instances, it is also desirable to remove phosphorus compounds from the influent wastewater. FIG. 2 illustrates another embodiment of the present invention, generally indicated by the numeral 50, which is designed specifically for removing nitrogen and phosphorus from the influent wastewater. In the embodiment shown in FIG. 2, the influent wastewater is first introduced through line 55 into an anaerobic stage 60, which includes cells 60a, 60b, and 60c. Cells 60a, 60b, and 60c are hydraulically distinct sections that approximate a plug-flow configuration. The use of a stage rector configuration would normally increase the overall rate of phosphorus release because the concentration of organics would be relatively high in the first cell.

After leaving the last cell 60c of the anaerobic stage 60, the mixed liquor passes to the first of two nitrogen removal stages 70 and 80. The nitrogen removal stages 70, 80 in this embodiment are arranged in the same manner as the nitrogen removal stages 20, 30 in the first embodiment of the invention 10 described above. Influent from the final cell 60c of the anaerobic stage 60 enters the anoxic zone 70a of the first nitrogen removal stage 70 through line 65. An aerobic treatment zone 70b follows the anoxic zone 70a. Mixed liquor circulates between the anoxic zone 70a and the aerobic zone 70b through lines 72 and 74 respectively. Mixed liquor also flows from the first aerobic zone 70b to the second anoxic zone 80a through line 75. In the second nitrogen removal stage 80, mixed liquor flows from the second anoxic zone 80a to the second aerobic zone 80b through line 82. After the second nitrogen removal stage 80, the mixed liquor is transferred to the final clarifier 90 through line 85. Activated sludge separated from the supernatant or treated wastewater is returned to the first cell 60a of the anaerobic stage 60 through lines 92 and 94, where it is mixed with the influent wastewater from line 55. Additional activated sludge is recycled to the second nitrogen removal stage 80 through lines 92 and 96. The purified supernatant is sent for further treatment or into a receiving stream through effluent line 95

In operation, the system 50 illustrated in FIG. 2 functions identically to the system 10 illustrated in FIG. 1, except that this embodiment also favors proliferation of phosphorus-storing microorganisms. The phosphorus storing microorganisms can readily assimilate organic matter present in the wastewater influent by hydrolyzing stored polyphosphates to provide energy for BOD absorption. As the organisms absorb BOD, phosphorus is released into the mixed liquor. When the mixed liquor is subsequently aerated, the absorbed BOD as well as the remaining BOD is oxidized. The energy of oxidation is utilized by the phosphorus-storing organisms for cell growth and for uptake of soluble phosphorus in the liquid, which may be stored as polyphosphates. During the aerobic treatment, the soluble phosphate values in the mixed liquor are rapidly reduced. The phosphorus is then removed from the system by wasting a portion of the activated sludge from the final clarifier 90.

The removal of nitrogen in the second embodiment 50 is accomplished in the same manner as in the first embodiment 10. The ammonia and organic nitrogen compounds in the mixed liquor pass through the anaerobic stage 60. Nitrification of the mixed liquor takes place in the aerobic zones 70b, 80b, and denitrification of nitrate and nitrite to elemental nitrogen takes place in the anoxic zones 70a, 80a. Activated sludge is retained under anaerobic conditions in the final clarifier 90 for a time period sufficient to permit denitrifying microorganisms to adapt to respiring $No_x^-$ instead of oxygen. Further, the activated sludge is not only recycled to form the mixed liquor, it is also recycled into line 75 between the first and second nitrogen removal stages 70, 80. As explained above in embodiment 10, this addition of return activated sludge directly into the second nitrogen removal stage supplies a large population of rejuvenated denitrifying microorganisms to the second anoxic zone. Thus, the second embodiment 50 combines BOD removal, nitrogen removal, and phosphorus removal into an activated sludge process where the sole energy source is provided by the BOD in the influent.

EXAMPLE

Table 1 sets forth contemplated typical operating conditions for the nitrogen removal process of the present invention.

TABLE 1

| OPERATING CONDITIONS | | |
|---|---|---|
| Influent Flow | (mgd) | 3 |
| Total IDT | (hrs) | 11.9 |
| 1st Anoxic Zone IDT | (hrs) | 1.4 |
| 1st Aerobic Zone IDT | (hrs) | 8.2 |
| 2nd Anoxic Zone IDT | (hrs) | 2.0 |
| 2nd Aerobic Zone IDT | (hrs) | 0.3 |
| 1st Stage Internal Recycle | (mgd) | 3 |
| RAS 1 | (mgd) | 1.2 |
| RAS 2 | (mgd) | 0.8 |
| MLSS 1 | (mg/l) | 2706 |
| MLSS 2 | (mg/l) | 3552 |
| Temperature | (°C.) | 25 |

Abbreviations
IDT = Influent Detention Time
RAS 1 = Return Activated Sludge recycled to the 1st nitrogen removal stage
RAS 2 = Return Activated Sludge recycled to the 2nd nitrogen removal stage
MLSS 1 = Mixed Liquor Suspended Solids in the 1st nitrogen removal stage
MLSS 2 = Mixed Liquor Suspended Solids in the 2nd nitrogen removal stage
mgd = millions of gallons per day The anticipated performance for these typical operating conditions is summarized in Table 2.

TABLE 2

| PERFORMANCE RESULTS | | |
|---|---|---|
| | Influent | Effluent |
| Total Suspended Solids (mg/l) | 83 | 12 |
| Total BOD (mg/l) | 150 | 10 |
| Ammonia (mg/l) | 20 | 0.5 |
| $No_x^-$ (mg/l) | 0.1 | 0.8 |
| Total Nitrogen (mg/l) | 30 | <3.0 |

The present invention achieves the object of optimizing nitrogen removal from wastewater to meet increasingly stringent environmental regulations, while at the same time providing an efficient, cost-effective process that minimizes capital outlays needed to retrofit existing activated sludge systems.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An activated sludge process for biologically removing nitrogen from wastewater, comprising the steps of:
   a) forming mixed liquor from influent wastewater and activated sludge;
   b) treating the mixed liquor in a first nitrogen removal stage, including the substeps of:

i) directing the mixed liquor into a first anoxic zone, ii) maintaining the mixed liquor under anoxic conditions within the first anoxic zone for a sufficient time period to permit denitrifying microorganisms to reduce nitrates and nitrites in the mixed liquor to elemental nitrogen, iii) transferring a portion of the mixed liquor from the first anoxic zone to a first aerobic zone, iv) aerating the mixed liquor within the first aerobic zone for a sufficient time period to permit nitrifying microorganisms to convert ammonia and organic nitrogen in the mixed liquor into nitrates and nitrites, and v) circulating the mixed liquor between the first anoxic zone and the first aerobic zone to effectuate denitrification and nitrification;

c) treating the mixed liquor in a second nitrogen removal stage by passing the mixed liquor through a second anoxic zone and a second aerobic zone to effectuate further denitrification and nitrification;

d) transferring the mixed liquor treated in the first and second nitrogen removal stages to a final clarifier where settled sludge is separated from purified supernatant;

e) retaining the sludge in the final clarifier for a period of time sufficient to permit denitrifying microorganisms in the sludge to adapt to respiring nitrates and nitrites instead of oxygen;

f) recycling a portion of the sludge from the final clarifier to form the mixed liquor; and g) recycling another portion of the sludge from the final clarifier into the mixed liquor between the first nitrogen removal stage and the second nitrogen removal stage so as to increase the population of microorganisms in the second nitrogen removal stage that have adapted to respiring nitrates and nitrites instead of oxygen.

2. The process of claim 1, wherein the sludge is retained in the final clarifier for a time period between 30 minutes and 4 hours.

3. The process of claim 2, wherein the sludge is retained in the final clarifier for a time period of approximately 2 hours.

4. The process of claim 1, wherein the sludge is recycled from the final clarifier at a rate of approximately 30%–80% of a wastewater influent rate into the process.

5. The process of claim 4, wherein the sludge is recycled from the final clarifier to form the mixed liquor before the first nitrogen removal stage at a rate of approximately 20%–60% of the wastewater influent rate.

6. The process of claim 4, wherein the sludge is recycled from the final clarifier into the mixed liquor between the first and second nitrogen removal stages at a rate of approximately 10%–30% of the wastewater influent rate.

7. The process of claim 1, wherein the step of treating the mixed liquor in the second nitrogen removal stage includes directing the mixed liquor from the first aerobic zone into the second anoxic zone.

8. The process of claim 1 wherein the mixed liquor is circulated from the aerobic zone back to the anoxic zone in each nitrogen removal stage at a rate of approximately 100%–200% of a wastewater influent rate into the process.

9. The process of claim 1, further including the steps of treating the mixed liquor in an anaerobic stage before treating the mixed liquor in the first nitrogen removal stage; and maintaining the mixed liquor in the anaerobic stage for a sufficient time period to allow proliferation of phosphate storing organisms.

10. A process for biologically removing nitrogen from wastewater using recycled activated sludge, comprising the steps of:

a) forming mixed liquor from influent wastewater and recycled activated sludge;

b) transferring the mixed liquor to a first nitrogen removal stage;

c) treating the mixed liquor in the first nitrogen removal stage, including the substeps of:

i) first, directing the mixed liquor into a first anoxic zone, ii) maintaining the mixed liquor under anoxic conditions within the first anoxic zone for a sufficient time period to permit denitrifying microorganisms to reduce nitrates and nitrites in the mixed liquor to elemental nitrogen, iii) transferring a portion of the mixed liquor from the first anoxic zone to a first aerobic zone, iv) aerating the mixed liquor within the first aerobic zone for a sufficient time period to permit nitrifying microorganisms to convert ammonia and organic nitrogen in the mixed liquor into nitrates and nitrites, and v) circulating the mixed liquor between the first anoxic zone and the first aerobic zone to effectuate denitrification and nitrification;

d) transferring the mixed liquor from the first nitrogen removal stage to a second nitrogen removal stage;

e) treating the mixed liquor in the second nitrogen removal stage, including the substeps of:

i) first, directing the mixed liquor into a second anoxic zone, ii) maintaining the mixed liquor under anoxic conditions within the second anoxic zone for a sufficient time period to permit denitrifying microorganisms to further reduce nitrates and nitrites in the mixed liquor to elemental nitrogen, iii) transferring mixed liquor from the second anoxic zone to a second aerobic zone, iv) aerating the mixed liquor within the second aerobic zone for a sufficient time period to permit nitrifying microorganisms to further convert ammonia and organic nitrogen in the mixed liquor into nitrates and nitrites;

f) transferring mixed liquor from the second nitrogen removal stage to a final clarifier where activated sludge is separated from purified supernatant;

g) retaining the activated sludge in the final clarifier under anaerobic conditions for a period of time sufficient to permit an increase in the concentrations of nitrate and nitrite reducing enzymes within the denitrifying microorganisms in the activated sludge;

h) recycling a portion of the activated sludge from the final clarifier to form the mixed liquor before treating the mixed liquor in the first nitrogen removal stage; and i) recycling another portion of the activated sludge from the final clarifier into the mixed liquor between the first nitrogen removal stage and the second nitrogen removal stage so as to increase the population of denitrifying microorganisms in the second anoxic zone that have adapted to respiring nitrates and nitrites instead of oxygen.

11. A biological wastewater treatment process for removing nitrogen from wastewater comprising:

a) mixing wastewater and return activated sludge to form mixed liquor;

b) directing the mixed liquor through first and second nitrification-denitrification treatment stages with each nitrification-denitrification treatment stage including both anoxic and aerobic treatment zones;

c) in each nitrification-denitrification stage, subjecting the mixed liquor to both nitrification and denitrification by biologically converting ammonia and organic nitrogen compounds to $NO_x^-$ and then denitrifying the $NO_x^-$ to produce elemental nitrogen;

d) directing the treated mixed liquor from the second nitrification-denitrification stage to a final clarifier and separating the treated mixed liquor into purified supernatant and activated sludge;

e) holding the activated sludge within the final clarifier under anaerobic conditions for a time period of approximately thirty minutes to four hours so as to encourage adaptation of denitrifying microorganisms to respiration of $NO_x^-$;

f) returning a portion of the activated sludge from the final clarifier to where the activated sludge is mixed with influent wastewater to form the mixed liquor; and g) returning a second portion of the activated sludge from the final clarifier to the anoxic treatment zone of the second nitrification-denitrification stage, bypassing the first nitrification-denitrification stage, wherein the denitrifying microorganisms of the activated sludge increase the denitrification rate in the anoxic treatment zone of the second nitrification-denitrification stage.

12. The process of claim 11, wherein the activated sludge held in the final clarifier is recycled to the anoxic zone of the second nitrification-denitrification stage at a flow rate of approximately 10%–30% of the flow rate of the influent wastewater.

* * * * *